(12) United States Patent
Chen

(10) Patent No.: US 9,085,311 B1
(45) Date of Patent: Jul. 21, 2015

(54) FOLDING WAGON WITH CANOPY

(71) Applicant: Zhaosheng Chen, El Monte, CA (US)

(72) Inventor: Zhaosheng Chen, El Monte, CA (US)

( * ) Notice: Subject to any disclaimer, the term of this patent is extended or adjusted under 35 U.S.C. 154(b) by 0 days.

(21) Appl. No.: 14/506,487

(22) Filed: Oct. 3, 2014

(51) Int. Cl.
B62B 3/02 (2006.01)
B62B 5/00 (2006.01)
B62B 5/06 (2006.01)
B62B 3/00 (2006.01)

(52) U.S. Cl.
CPC ............... *B62B 3/025* (2013.01); *B62B 3/007* (2013.01); *B62B 5/0013* (2013.01); *B62B 5/067* (2013.01)

(58) Field of Classification Search
CPC .............. B62B 3/00; B62B 3/02; B62B 3/04; B62B 3/002; B62B 3/007
See application file for complete search history.

(56) References Cited

U.S. PATENT DOCUMENTS

| 2,350,062 | A | * | 5/1944 | Mosier | 280/87.01 |
|---|---|---|---|---|---|
| 4,746,140 | A | * | 5/1988 | Kassai | 280/642 |
| 4,765,636 | A | * | 8/1988 | Speer | 280/47.11 |
| 5,722,682 | A | * | 3/1998 | Wang | 280/642 |
| 6,663,121 | B2 | * | 12/2003 | Santos et al. | 280/47.38 |
| 7,478,825 | B2 | * | 1/2009 | Tomasi et al. | 280/642 |
| 7,625,033 | B2 | * | 12/2009 | Michelau et al. | 296/177 |
| 8,011,686 | B2 | * | 9/2011 | Chen et al. | 280/651 |
| 8,220,824 | B2 | * | 7/2012 | Chen et al. | 280/651 |
| 8,388,015 | B2 | * | 3/2013 | Chen | 280/647 |
| 2011/0025005 | A1 | * | 2/2011 | Howell | 280/47.24 |
| 2011/0204598 | A1 | * | 8/2011 | Stevenson | 280/639 |
| 2012/0248720 | A1 | * | 10/2012 | Grato | 280/47.4 |
| 2014/0001735 | A1 | * | 1/2014 | Yang et al. | 280/651 |
| 2014/0021697 | A1 | * | 1/2014 | Kikui | 280/642 |

* cited by examiner

*Primary Examiner* — Jeffrey J Restifo
*Assistant Examiner* — Travis Coolman
(74) *Attorney, Agent, or Firm* — Clement Cheng

(57) ABSTRACT

A folding wagon with a canopy has a front frame having a trapezoidal shape. The front frame is made of a front top horizontal member connected to a pair of front vertical members, namely a front left vertical member and a front right vertical member. The rear frame has a trapezoidal shape. The rear frame is made of a rear top horizontal member connected to a pair of rear vertical members, namely a rear left vertical member and a rear right vertical member. A crossbar assembly connects the front frame to the rear frame. The crossbar assembly forms a left side wall and a right side wall of the folding wagon. A folding bottom panel connects the front frame to the rear frame. The folding bottom panel forms a floor of the folding wagon.

16 Claims, 3 Drawing Sheets bottom panel
extended
position not flat

FOLDING WAGON WITH CANOPY

FIELD OF THE INVENTION

The present invention is in the field of folding wagons with canopies.

DISCUSSION OF RELATED ART

A collapsible multi-purpose utility carts and wagons can provide practical everyday transportation tools. Unfortunately, most wagons cannot be folded and they are difficult to carry or store. Wagons have been used to transport heavy items, bulk items, small children, and similar items since they were first introduced into the market. A traditional wagon generally has an open, flat bed, four wheels, and a handle for pushing or pulling. The traditional wagon's inability to fold down to a compact, easily transportable size has proved to be an issue that requires improvement. As a result, several modifications of the traditional wagon have been invented.

One such invention is U.S. Pat. No. 469,459 filed May 2, 1893 by inventor James H. Waggener et al., the disclosure of which is incorporated herein by reference. The wagon body is designed such that two sides of the wagon are hinged to the bottom of the wagon and can be folded on the body allowing for compact transportation of the wagon when necessary.

A similar invention is a collapsible wagon as described in United States Patent publication number US 2014/0001735 filed Jun. 29, 2012 by inventor Baoqing Yang, the disclosure of which is incorporated herein by reference. This invention provides a wagon with a frame that can be altered from its expanded to its collapsed configuration along with the telescoping tow handle that is adjustable between the two configurations.

Another similar invention is presented in United States Patent publication number US 2003/0025301 filed Dec. 8, 2000 by inventor Henry Banuelos III, the disclosure of which is incorporated herein by reference. This wagon is constructed in a durable and reliable manner, providing a net for storing cargo with the net capable of extending between the bottom panel assembly and the upper rail for forming a cargo compartment, which allows for enhanced portability and compact storage.

The invention presented in United States Patent publication number US 2011/0204598 filed Feb. 24, 2010 is another example of a folding wagon. This folding wagon opens and closes in a scissor-like motion from a collapsed position to an expanded position. The frame is constructed such that the upper ends of the cross members are connected to sliding joints that move along the attached tower members.

A folding wagon with seats as seen in U.S. Pat. No. 8,388, 015 filed Mar. 2, 2010 by inventor Zhaosehng Chen is another similar twist to the traditional wagon, the disclosure of which is incorporated herein by reference. The folding frame has a pair of front and rear vertical supports each with a lower front and rear horizontal support and an upper front and rear horizontal support connecting them. The folding frame also has supplemental links that form a front and rear seat.

Another older example of a folding wagon is found in U.S. patent Ser. No. 155,036 filed Apr. 10, 1950 by inventor Howard D. East, the disclosure of which is incorporated herein by reference. The wagon is made up of parts that can be quickly folded into a reduced size, allowing the wagon to be placed into a somewhat small carrying case. The collapsible wagon is designed to carry goods while still being light weight and convenient to pull.

SUMMARY OF THE INVENTION

The present invention provides an easy to fold, and easy to store, versatile tool cart. The multipurpose folding tool cart can be folded to a stowed position and opened to a deployed position via moving linkages forming a wagon frame. Pulling up the webbing that covers the folding bottom panel for folding, can fold up the whole wagon since the wagon is made of interlocking folding members. Preferably, the wagon is light weight of about 12 kg and can carry a load of about 65 kg.

A folding wagon with a canopy has a front frame having a trapezoidal shape. The front frame is made of a front top horizontal member connected to a pair of front vertical members, namely a front left vertical member and a front right vertical member. The rear frame has a trapezoidal shape. The rear frame is made of a rear top horizontal member connected to a pair of rear vertical members, namely a rear left vertical member and a rear right vertical member. A crossbar assembly connects the front frame to the rear frame. The crossbar assembly forms a left side wall and a right side wall of the folding wagon. A folding bottom panel connects the front frame to the rear frame. The folding bottom panel forms a floor of the folding wagon.

Canopy rods include a front left canopy rod, a front right canopy rod, a rear left canopy rod and a rear right canopy rod. The front left canopy rod extends from the front left vertical member. The front right canopy rod extends from the front right vertical member. The rear left canopy rod extends from the rear left vertical member. The rear right canopy rod extends from the rear right vertical member. Each of the canopy rods has a canopy rod cap mounted at an upper end of each of the canopy rods. Each of the canopy rod caps have a larger diameter than the diameter of the canopy rod. A canopy fits over the canopy rods. A retractable handle swivel connects to the front frame. The retractable handle has a telescopic configuration. The retractable handle comprises an upper telescopic handle extension and a lower telescopic handle extension. Four wheels include a pair of rear wheels and a pair of front wheels mounted to a pair of front wheel assemblies. The pair of front wheel assemblies has a four bar mechanism so that the front wheels turn in the direction of the retractable handle.

The four bar mechanism has a left four bar steering attachment connected to the left front wheel assembly and a right four bar steering attachment connected to the right front wheel assembly, and further comprises a four bar linkage rod connected to the left four bar steering attachment and also connected to the right four bar steering attachment. The four bar linkage rod is connected to the retractable handle and steered by the retractable handle. The canopy is rectangular and has four plastic cards that are each shaped with a notch to respectively engage each rod cap of each canopy rod. Each canopy rod is mounted within a frame connector. Each frame connector further comprises a guide sleeve engaging with a piston. Each piston is mounted to a lower end of each canopy rod. Each guide sleeve is configured to retain each piston and retain each canopy rod in an extended position when each canopy rod is extended. The retractable handle has a retractable handle latch for latching the retractable handle in an extended position. The retractable handle has a handle clip mounted on the front frame. The handle clip retains the retractable handle in a substantially vertical position. The folding wagon with a canopy has a pair of wheel stands mounted to the pair of rear wheel assemblies.

The folding bottom panel folds to an angle that locks the folding bottom panel into a folding bottom panel extended position. The folding bottom panel extended position is not flat. The folding wagon with a canopy also has a frame latch that automatically latches the crossbar assembly into a closed position when the folding wagon is folded into a folded position. The folding wagon with a canopy has a rear basket having a rear basket side. The rear basket is pivotally attached to the rear frame. The canopy rods are angled outward at between 5° angle and 20° angle from a vertical direction.

Figure 1:
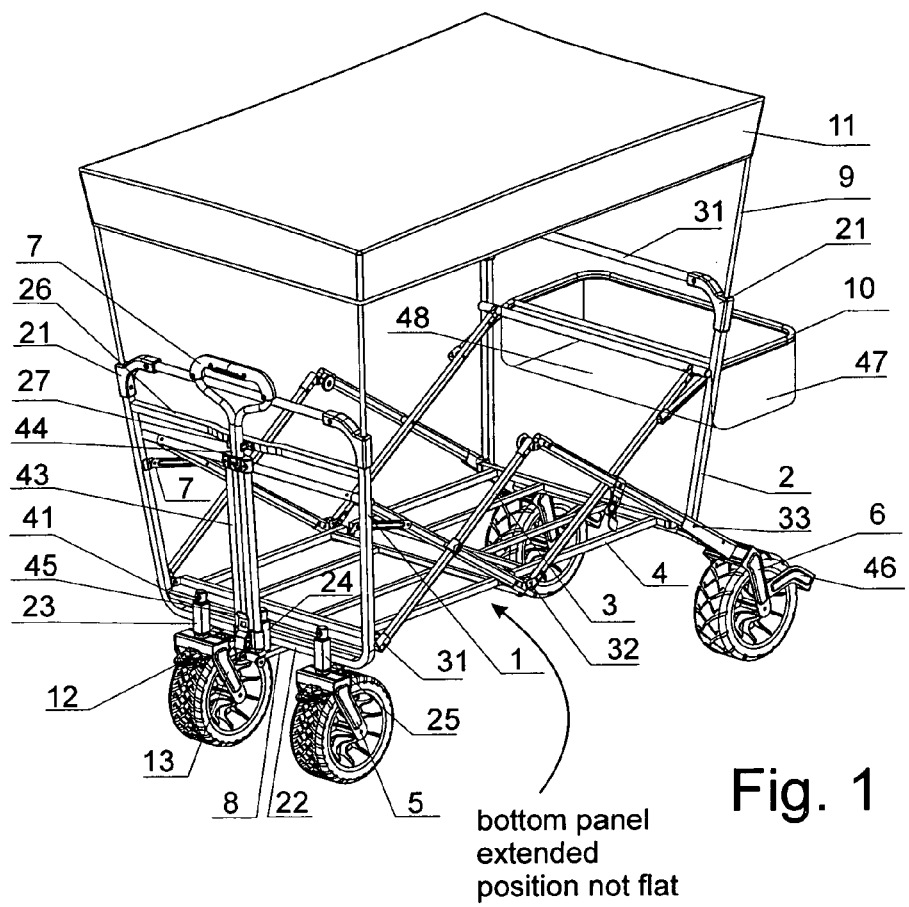
FIG. 1 is a perspective view diagram of the present invention.
Figure 2:
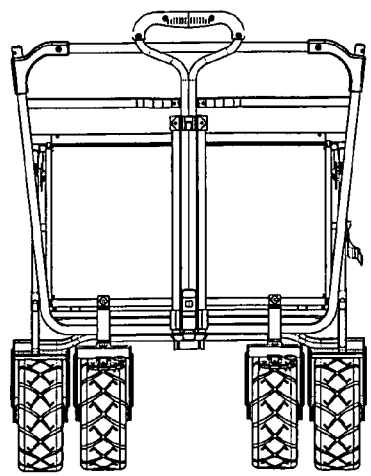
FIG. 2 is a front view of the folding wagon.
Figure 3:
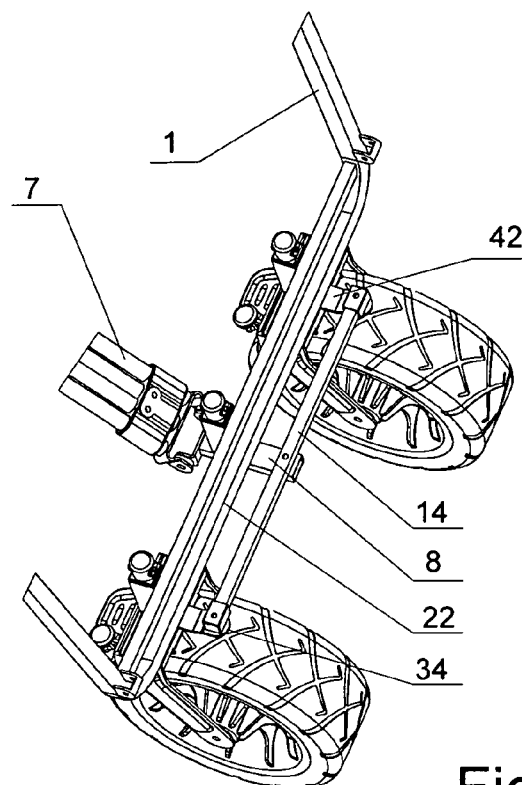
FIG. 3 is a top view of the steering mechanism.
Figure 4:
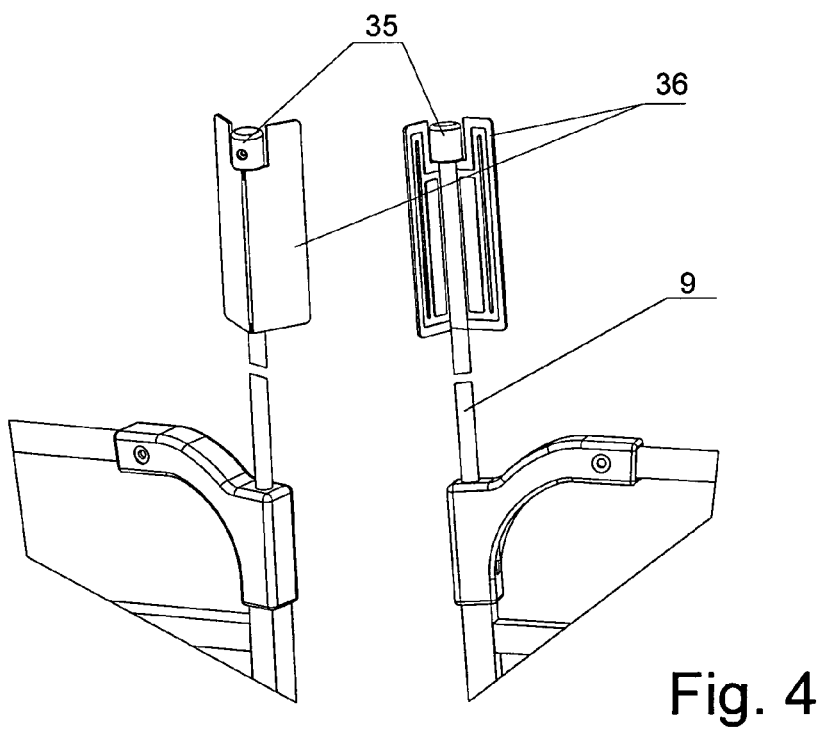
FIG. 4 is a diagram showing the engagement between the canopy rods and the canopy guide.
Figure 5:
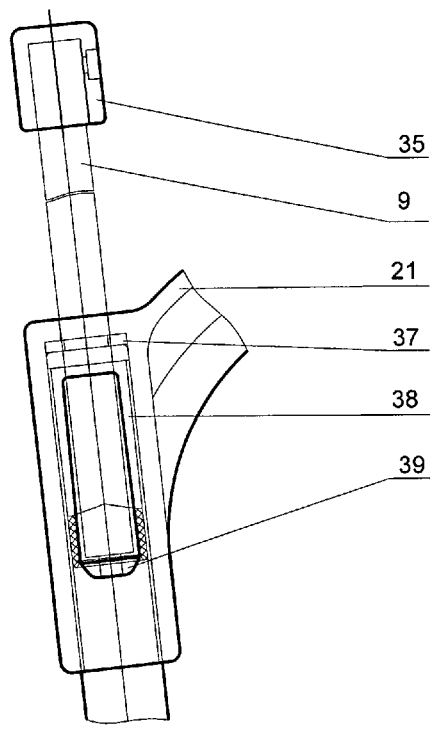
FIG. 5 is a diagram showing the canopy rod extension retaining mechanism.
Figure 6:
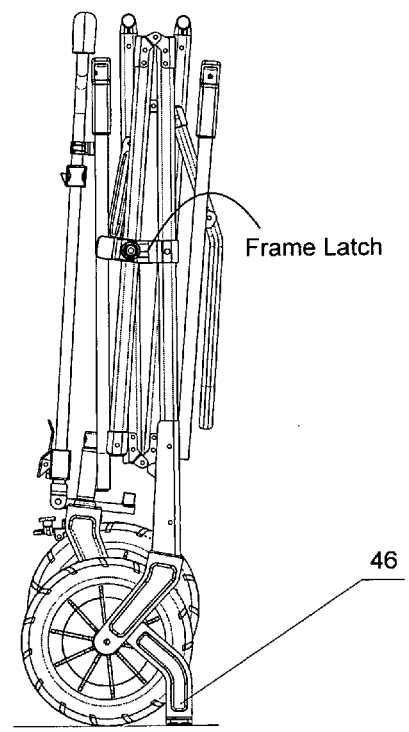
FIG. 6 is a side view of the folding wagon in a folded configuration.

The following call out list of elements can be a useful guide in referencing the elements of the drawings.
1 Front Frame
2 Rear Frame
3 Frame Cross Bar Assembly
4 Folding Bottom
5 Front Wheel Assembly
6 Rear Wheel Assembly
7 Retractable Handle
8 Four-Bar Linkage
9 Canopy Rod
10 Folding Rear Frame Linkage Assembly
11 Awning Cloth
12 Tire
13 Wheel Retainer
14 Four Bar Linkage Rod
21 Frame Connector
22 Front Bottom Horizontal Member
23 First Vertical Shaft Jacket
24 Second Vertical Shaft Jacket
25 Third Vertical Shaft Jacket
26 Front Crossbar
27 Handle Clips
31 First Rotational Axis
32 Second Rotational Axis
33 Third Rotational Axis
34 Four Bar Steering Linkage Joint
35 Rod Cap
36 Plastic Cards
37 Anti-Skid Rubber Sheet
38 Guide Sleeve
39 Piston
41 Lower Front Crossbar
42 Four Bar Steering Attachment
43 Lower Telescopic Handle Extension
44 Upper Telescopic Handle Extension
45 Telescopic Handle Extension Latch
46 Wagon Stand
47 Rear Basket
48 Rear Basket Side

DETAILED DESCRIPTION OF THE PREFERRED EMBODIMENT

The folding wagon has a front frame 1 and a rear frame 2. The front frame 1 is connected to the rear frame 2 by a frame crossbar assembly 3 and a folding bottom panel 4. The front frame is made of a front top horizontal member connected to a pair of front vertical members. The front bottom horizontal member is also connected to a pair of front vertical members. The front frame has a front crossbar 26 extending from the left front vertical member to the right front vertical member.

The upper end of the left front vertical member is connected to the left end of the front top horizontal member and the lower end of the left front vertical member is connected to the left end of the front bottom horizontal member 22. Similarly, the upper end of the right front vertical member is connected to the right end of the front top horizontal member and the lower end of the right front vertical member is connected to the right end of the front bottom horizontal member 22.

The front frame is connected to the rear frame with a folding frame crossbar assembly 3. The folding frame crossbar assembly 3 has a leaning bar that provides a leaning connection. The folding bottom panel 4 is made of a pair of bottom frames that are jointed for folding alone a mid section of the pair of bottom frames. The folding bottom panel 4 is also backed by a rigid planar panel such as a pair of rectangular pieces of cardboard or a pair of rectangular fiberboard panels. The rigid planar panels can be attached to or sewn inside pockets of a fabric basket that is suspended from the wagon frame.

The front wheel assembly 5 includes a front pair of wheels and the rear wheel assembly 6 includes a rear pair of wheels.

A retractable handle 7 controls a four bar linkage 8. The four bar linkage 8 is connected to the retractable handle 7 and has a four bar linkage rod 14 that is connected to a pair of four bar steering attachments 42. When the user steers the retractable handle 7, the four bar linkage rod 14 is swiveled to be parallel to the retractable handle 7 on the horizontal plane. The four bar linkage rod 14 moves the four bar steering attachment 42. The pair of four bar steering attachments 42 comprise two bars of the four bar linkage and are connected to the four bar linkage rod 14 at a pair of four bar steering linkage joints 34.

The fourth bar of the four bar linkage mechanism 8 is the front bottom horizontal member 22. The front bottom horizontal member is a portion of the front frame 1. Three vertical shaft jackets hold three vertical shafts that are free to rotate within the vertical shaft jackets. The three vertical shaft jackets are welded to the front bottom horizontal member 22. The vertical shaft jackets can be made of rectangular cross-section tubular steel and the shafts held within the vertical shaft jackets can be of rounded cross-section. The first vertical shaft jacket 23 provides a swivel for the right front wheel assembly 5. The second vertical shaft jacket 24 provides a swivel for mounting the retractable handle 7. The third vertical shaft jacket 25 provides a swivel for the left front wheel assembly 5.

Four canopy rods 9 extend upward from the wagon frame to provide a secure connection for a canopy. Each canopy rod 9 has a rod cap 35 mounted to the top tip of the canopy rod 9. The canopy rod can be retracted into the frame connector 21. The frame connector 21 connects a horizontal frame member with a vertical frame member. The canopy rods 9 have a piston 39 that slides inside a guide sleeve 38. An antiskid rubber sheet 37 retains the canopy rod 9 in a locked position when the canopy rod 9 is pulled upward against the frame connector 21.

The rod cap 35 fits inside a slot cut in a plastic card 36. The plastic card 36 is mounted to the canopy rod 9. The plastic card 36 is stitched to the awning cloth 11 of the canopy. The plastic card 36 has a generally slightly less than a right angle that allows it to engage two sides of the rod cap 35. The canopy rods 9 are preferably oriented at approximately 15° from an entirely vertical position with the trapezoidal angle providing the proper orientation so that the rods can be bent to a generally vertical position to provide a tension that pushes the rod cap 35 into the depression that is formed on the slot cut of the plastic card 36. The plastic card 36 is a generally rectangular flexible sheet of plastic of approximately 1-3 mm so as to provide some rigidity and structure without being substantially inflexible. The plastic cards 36 can also be glued to the corners of the awning cloth 11 instead of being stitched. The canopy rods can be made with elastic fibers such as fiberglass so that the awning cloth remains taut and biased into its deployed position.

The wagon stand 46 is a foot that is connected to the rear wheel assembly 6. A right wagon stand 46 is connected to the right rear wheel assembly 6 and a left wagon stand 46 is connected to the left rear wheel assembly 6. The wheel retainer 13 has an axle that holds the tire 12 of the wheel. Each of the wheels have a wheel retainer. The wagon stand 46 is preferably welded to one or two of the rear wheel retainers.

The folding rear frame linkage assembly 10 can include a rear basket 47 having a rear basket side 48 facing the wagon. The folding rear frame linkage assembly 10 is jointed to the crossbar assembly 3 so that the folding frame linkage assembly 10 folds along with the crossbar assembly 3. The crossbar assembly 3 is jointed at a first rotational axis 31, a second rotational axis 32, and a rotational axis 33. The crossbar assembly folds from a folded position to a deployed position. Crossbar assemblies are well known in the prior art.

The folding bottom 4 bows downward so that it locks to prevent accidental folding of the frame. The downward bow of the folding bottom 4 is analogous to a knee that can lock into an extended position. The folding bottom 4 has a pair of panels that has an angle of less than 5° from 180°.

The frame of the wagon preferably includes a front frame assembly composed of two poles and four crossbars. The four crossbars are connected to each other using the frame connector 21 which is preferably made of a different material than the four crossbars. The frame connector 21 is preferably a plastic member. The front frame 1 and the rear frame 2 are both preferably trapezoidal. The three vertical shaft jackets can be the same part that is welded to different locations. The second vertical shaft jacket is between the first and third vertical shaft jackets so the second vertical shaft jacket is also an intermediate shaft jacket. The intermediate shaft jacket can receive the steering rod of the four bar mechanism. The four bar mechanism can be welded to the front bottom horizontal member 22.

Further support for the front frame can be provided by a front crossbar 26. The front crossbar 26 can have a handle clip 27 for retaining the retractable handle 7. The retractable handle 7 can be set in a vertical position where the retractable handle is clipped to the handle clip 27. The retractable handle 7 has an upper telescopic handle extension 44 and a lower telescopic handle extension 43. The upper telescopic handle extension 44 can be made as a pair of tubes that slides between the lower telescopic handle extension 43 which is also made of a pair of tubes. A telescopic handle extension latch 45 can provide a locking means for locking the telescopic handle extension in an extended position. The lower front crossbar 41 extends across the front frame 1 and provides an additional surface for the vertical shaft jackets to be mounted to the lower front crossbar 41 and the front bottom horizontal member 22. The lower front crossbar 41 can be stacked on top of the front bottom horizontal member 22.

The invention claimed is:

1. A folding wagon with a canopy comprising:
    a. a front frame having a trapezoidal shape, wherein the front frame is made of a front top horizontal member connected to a pair of front vertical members, namely a front left vertical member and a front right vertical member;
    b. a rear frame having a trapezoidal shape, wherein the rear frame is made of a rear top horizontal member connected to a pair of rear vertical members, namely a rear left vertical member and a rear right vertical member;
    c. a crossbar assembly connecting the front frame to the rear frame, wherein the crossbar assembly forms a left side wall and a right side wall of the folding wagon;
    d. a folding bottom panel connecting the front frame to the rear frame, wherein the folding bottom panel forms a floor of the folding wagon;
    e. canopy rods including: a front left canopy rod; a front right canopy rod; a rear left canopy rod and a rear right canopy rod, wherein the front left canopy rod extends from the front left vertical member, wherein the front right canopy rod extends from the front right vertical member, wherein the rear left canopy rod extends from the rear left vertical member, wherein the rear right canopy rod extends from the rear right vertical member, wherein each of the canopy rods has a canopy rod cap mounted at an upper end of each of the canopy rods, wherein each of the canopy rod caps have a larger diameter than the diameter of the canopy rod;
    f. a canopy fitted over the canopy rods;
    g. a retractable handle swivel connected to the front frame, wherein the retractable handle has a telescopic configuration, and wherein the retractable handle comprises an upper telescopic handle extension and a lower telescopic handle extension; and
    h. four wheels including a pair of rear wheels and a pair of front wheels mounted to a pair of front wheel assemblies, wherein the pair of front wheel assemblies has a four bar mechanism so that the front wheels turn in the direction of the retractable handle, wherein the four bar mechanism has a left four bar steering attachment connected to the left front wheel assembly and a right four bar steering attachment connected to the right front wheel assembly, and further comprising a four bar linkage rod connected to the left four bar steering attachment and also connected to the right four bar steering attachment, wherein the four bar linkage rod is connected to the retractable handle and steered by the retractable handle, wherein the canopy is rectangular and has four plastic cards that are each shaped with a notch to respectively engage each rod cap of each canopy rod.

2. The folding wagon with a canopy of claim 1, wherein the canopy rods are angled outward at between 5° angle and 20° angle from a vertical direction.

3. The folding wagon with a canopy of claim 2, wherein each canopy rod is mounted within a frame connector, wherein each frame connector further comprises a guide sleeve engaging with a piston, wherein each piston is mounted to a lower end of each canopy rod, wherein each guide sleeve is configured to retain each piston and retain each canopy rods in an extended position when each canopy rod is extended.

4. The folding wagon with a canopy of claim 3, wherein the retractable handle has a retractable handle latch for latching the retractable handle in an extended position.

5. The folding wagon with a canopy of claim 4, wherein the retractable handle has a handle clip mounted on the front frame, wherein the handle clip retains the retractable handle in a substantially vertical position.

6. The folding wagon with a canopy of claim 5, further comprising: a pair of wheel stands mounted to the pair of rear wheel assemblies.

7. The folding wagon with a canopy of claim 6, wherein the folding bottom panel folds to an angle that locks the folding bottom panel into a folding bottom panel extended position, wherein the folding bottom panel extended position is not flat.

8. The folding wagon with a canopy of claim 7, further comprising: a frame latch that automatically latches the crossbar assembly into a closed position when the folding wagon is folded into a folded position.

9. The folding wagon with a canopy of claim 8, further comprising: a rear basket having a rear basket side, wherein the rear basket is pivotally attached to the rear frame.

10. The folding wagon with a canopy of claim 1, wherein each canopy rod is mounted within a frame connector, wherein each frame connector further comprises a guide sleeve engaging with a piston, wherein each piston is mounted to a lower end of each canopy rod, wherein each guide sleeve is configured to retain each piston and retain each canopy rods in an extended position when each canopy rod is extended.

11. The folding wagon with a canopy of claim 1, wherein the retractable handle has a retractable handle latch for latching the retractable handle in an extended position.

12. The folding wagon with a canopy of claim 1, wherein the retractable handle has a handle clip mounted on the front frame, wherein the handle clip retains the retractable handle in a substantially vertical position.

13. The folding wagon with a canopy of claim 1, further comprising: a pair of wheel stands mounted to the pair of rear wheel assemblies.

14. The folding wagon with a canopy of claim 1, wherein the folding bottom panel folds to an angle that locks the folding bottom panel into a folding bottom panel extended position, wherein the folding bottom panel extended position is not flat.

15. The folding wagon with a canopy of claim 1, further comprising: a frame latch that automatically latches the crossbar assembly into a closed position when the folding wagon is folded into a folded position.

16. The folding wagon with a canopy of claim 1, further comprising: a rear basket having a rear basket side, wherein the rear basket is pivotally attached to the rear frame.

* * * * *